Patented Aug. 14, 1934

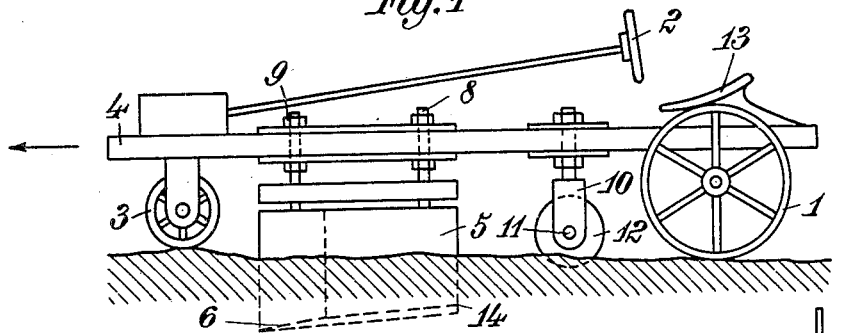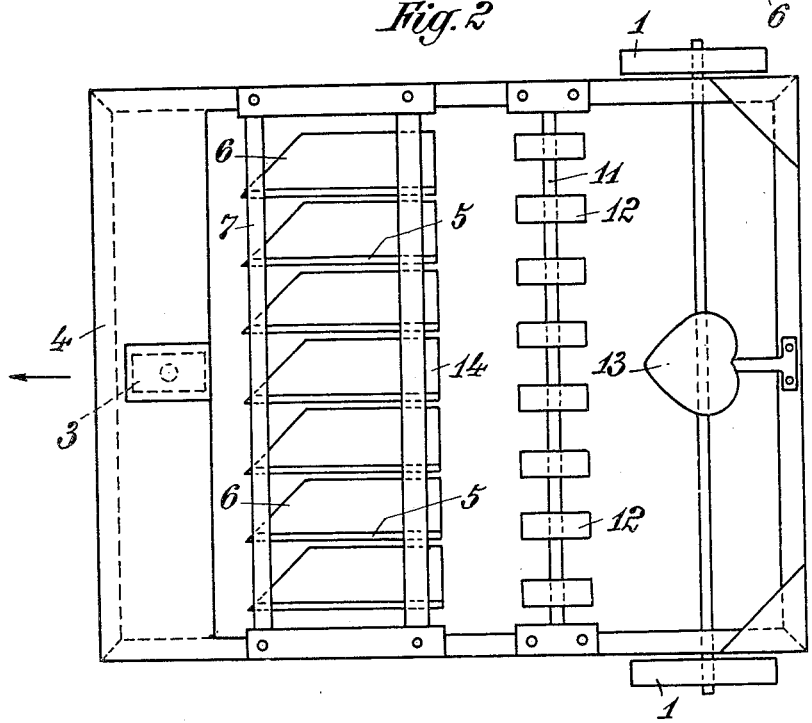

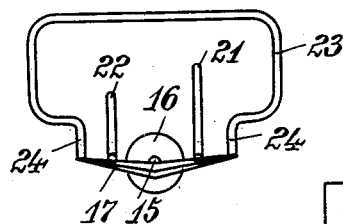
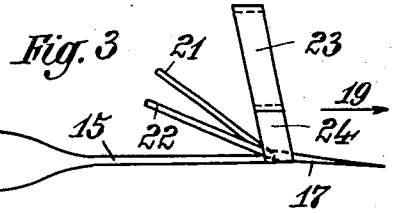
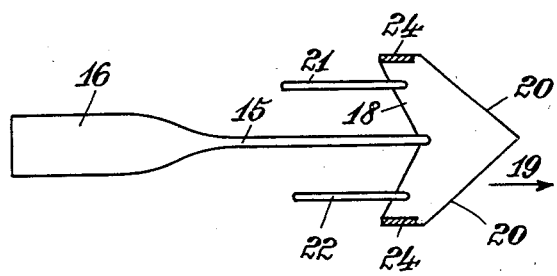
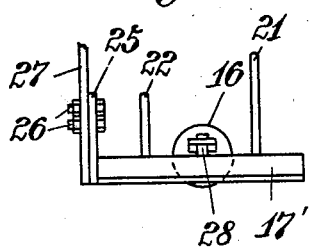
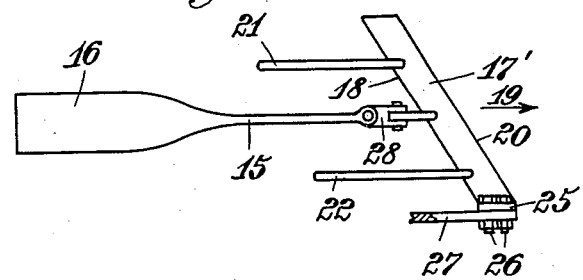
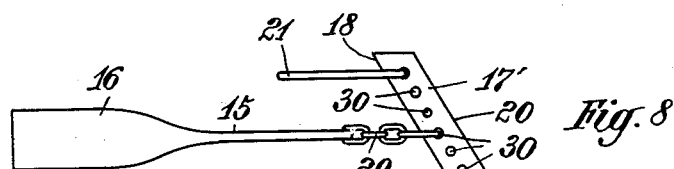
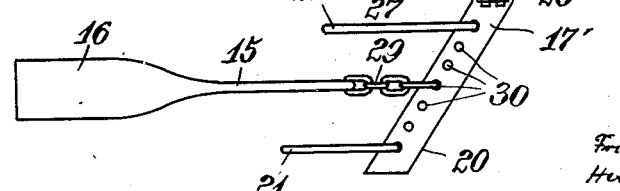

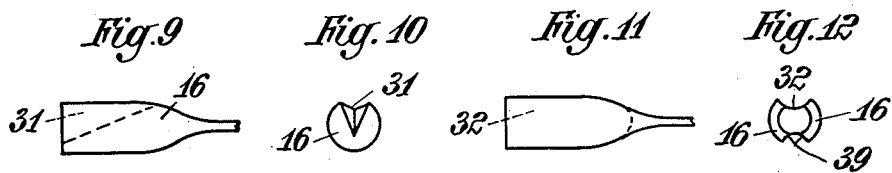
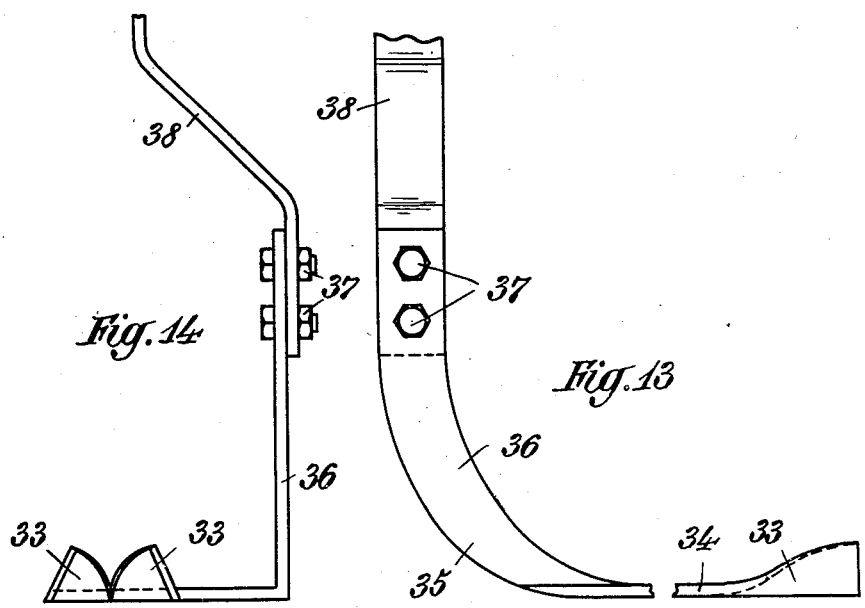
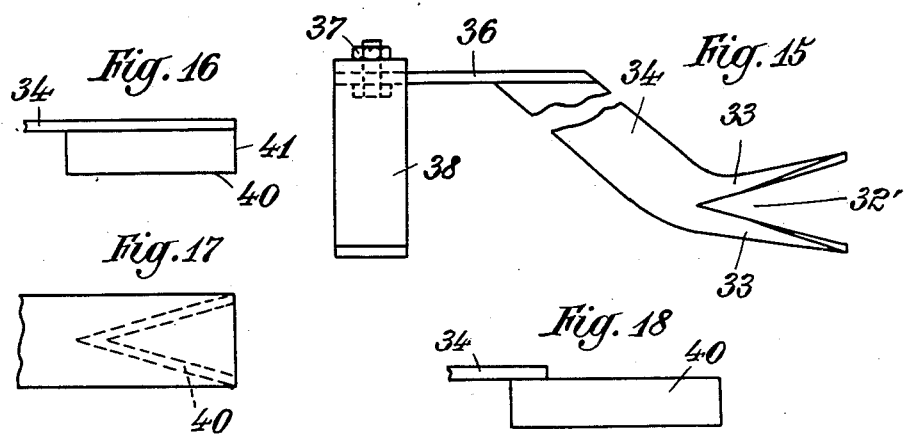

1,969,949

UNITED STATES PATENT OFFICE 1,969,949

METHOD AND APPARATUS FOR WORKING ARABLE LAND, ESPECIALLY FOR THE DEEPER SETTING OF PLANTS

Friedrich Schröder - Stranz, Berlin - Steglitz, Hermann Denstädt, Berlin, and Friedrich Denstädt, Brandenburg, Germany Application September 14, 1932, Serial No. 633,152
In Germany January 19, 1931

6 Claims. (Cl. 55—18)

For deeper setting of plants, especially of cereals, without removing them from the earth a method is known according to which, laterally of the rows of plants produced by sowing in drills, vertical or inclined furrows are formed by removing a portion of the earth, the ridges remaining between the furrows and carrying the plants being pressed down by means of a roller in order to attain a lower setting of the plants than heretofore. This method is open to the objection that, for producing the necessary looseness of the soil, earth must be displaced which passes in upward direction, spreads laterally and frequently covers the young crop. Consequently, it is necessary to make the drills at a considerable distance apart and in the case of certain kinds of soil even with this wide spacing difficulties are encountered.

This invention solves the problem of deeper setting the rows of plants without throwing up earth. For this purpose the rows of young plants are pressed into the earth by small rollers shortly after they have come through and thereby the rows of plants are lowered as compared with their former position. The looseness of the soil, necessary for pressing in the plants, can be attained by previous deep working of the seed bed, especially by sub-soil loosening, in which case subsequent pressing of the soil has to be avoided. The solidity of the soil necessary for producing the capillarity is imparted subsequently by the pressure of the rollers sinking the rows of seedlings. As no earth is thrown up which might cover the deep plants, these remain freely exposed in the deep pressed furrows. When, after a certain time the plants have again recovered and attained the necessary size, the strips of earth remaining between the furrows are levelled in a suitable manner, for instance by harrowing transversely, so that the plants are covered with earth to the necessary height. Owing to the previous sinking and subsequent surrounding with earth, the advantages of the sinking of plants of cereals are attained to a considerable extent in a reliable manner without destroying any of the seedlings and independently of the nature of the soil. This method also possesses the further advantage that an intensified water supply reaches the place where the plants are situated. As it is endeavoured to obtain the greatest possible loosening of the soil, the subsequent consolidation of which is effected merely under the plants themselves, an increased supply of sub-soil moisture towards the lowered pressed strips takes place especially during the period of development of the young plants, whereas in the strips which remain loose the capillarity and therefore evaporation is reduced.

A considerable increase in the looseness of the soil necessary for the deeper setting of plants is attainable in that, a short time before carrying out the pressing down of the soil by the rollers, or preferably during this operation, underground shares of known shape are drawn under the surface of the soil, thereby lifting and loosening the soil without throwing it up or turning same; the shares can only work under the rows of plants themselves or in the free width of rows and intervening spaces. Further, for each row or, for each row and intervening space, only one share may be employed, or two or more shares may run either at the same depth or at different depths. The power required is only slight. A subsidiary effect of the cutting through the sub-soil during the setting deeper of the plants is the destruction of the deep-rooted weeds.

Instead of loosening the soil by means of underground shares, it is possible to produce by means of special tools passages or spaces extending substantially parallel to the surface, under the drilled or dibbled rows of plants. The method can, however, also be employed, when the plants are not drilled or dibbled but sown in any other manner. A pressure is then applied on to the rows of plants thus undermined, causing sinking of the rows of plants. Experiments have shown, that a very slight pressure is sufficient for pressing down the rows of plants. In the case of light soil a pressure roller, in certain circumstances, may be omitted entirely as the undermined strips of earth sink by gravity after the passage of the share. The production of the passages or spaces presents general advantages independently of the method for the lower setting of the plant. The passages produced in the earth by the method according to the invention allow an exchange between the carbondioxide enclosed in the earth and the air rich in oxygen contained in the passages. The cracks resulting from the production of the passages, and the shaking and loosening of the soil accompanying the method still further improve the exchange of gases. If necessary, the formation of cracks can be increased by special tools.

The passages produced in the soil collapse after a certain time when the soil settles. To the soil a crumbly structure is thus imparted which continues to maintain the desired gas exchange after the collapse of the passages, facilitates the working and treatment of the soil and forms the basis for a good fertilizing by stimulation of the bacteria.

The passages are formed according to the prevailing conditions in the cultivated stratum or in the subsoil. The method can be carried out before sowing of the plants or during the vegetation period.

The device for carrying out the method consists substantially of a burrowing element, the front end of which is of slender shape, and which increases in cross section towards the rear. Such a device can easily be passed under the surface of the earth without exerting of considerable force, and it produces the desired passages. In order to further increase the vibrations and crack-formations in the soil which are attained by working with this device, shares or coulters are combined with the burrowing element, which cut through the ground. These coulters can be arranged substantially in a vertical plane, in which case the holder itself can be constructed as a coulter share. On the other hand, coulters may be connected to the burrowing element which lie substantially in a horizontal plane, but are slightly inclined towards the axis of the burrowing elements, so that on being moved forward, they slightly lift the soil and allow it to again drip behind their rear edges. The device thus constructed produces in the ground cracks extending transversely to the direction of movement. The cutting edge of the share or coulter is preferably placed obliquely to the direction of travel, in order that roots caught during the work are deflected towards the sides. The coulters have preferably tines or fingers which tear up the soil in the direction of travel and thus produce cracks in the soil extending transversely to the first mentioned cracks, so that the whole of the surface of the earth is covered with a net-work of intersecting cracks. These fingers are preferably set at an angle to the axis of the burrowing element, so that each finger is at a different angle of inclination to the axis of the burrowing element. The individual fingers may be made in different lengths, so that the earth is prevented from clogging between the tines and the burrowing element. The burrowing element proper is either rigidly connected with the coulters or shares, or it is rendered movable relative to the same by means of a chain or a joint, so that its axis lies always in the direction of movement, no matter what position the coulter assumes. Moreover, the burrowing element may be made laterally adjustable relative to the coulter, so that the device can be adapted to the spacing of the individual rows of plants. The coulters are preferably adjustably fixed on the holder.

It has been found, that the burrowing element in its simple form possesses certain objections, which consist chiefly in that the earth is raked up. Chiefly when the burrowing element is conducted under a row of plants, particularly when deeper setting plants, this objection becomes apparent in that the plants are sometimes pulled over. This occurs chiefly, when the burrowing element is not conducted accurately under the drill rows. The plants are then moved laterally of the crack or low mount and tip over. Consequently, the following pressure wheel passes the plants laterally without coming into contact therewith, so that it cannot exert the deeper setting effect.

The raking up effect of the burrowing element is due to the fact that it produces the same pressure forces in upward direction as towards the sides and in downward direction, as in its original form it has pressure faces at every point of its circumference. The resistance of the soil from the surface is, however, much less high than that from the sides and from below with the result that the strip of earth above the displacer path is lifted or torn asunder. These objections are overcome by constructing and arranging the burrowing element in such a manner, that it is equipped with only as many pressure faces as are necessary for producing the hollow space. For example, the burrowing element may have a cavity in its upper surface by means of which the upper pressure surface is removed. The cavity preferably extends downwards so that the element has a slot extending from the upper to the lower surface. A further advantage results herefrom as, owing to the lower pressure surface also being missing, the edges of the side faces of the burrowing element cut more easily and more reliably into the earth. A further advantage of the cavity or slot consists in the saving in weight. It is thus possible to make the burrowing element more projecting without any increase of weight or of the surface producing the frictional resistance being connected therewith. The effect of the upper pressure face can be also removed by arranging the burrowing element with its axis, instead of as heretofore in the plane of the holding coulter, below this coulter so that the plane of the coulter is substantially flush with the upper edge of the burrowing element. Either the coulter is extended to the end of the burrowing element offering simple possibility of fixing, or a continuous slot is made in the burrowing element. The side faces of the burrowing element are preferably so shaped that the forces exerted by the earth do not tend to press the burrowing element in upward direction, but maintain it at the depth to which it has been adjusted. As the forces coming from below are generally greatest, it is advisable to arrange the side faces so that the forces acting thereon have downwardly directed components.

Several forms of construction of devices for carrying out the method according to the invention are illustrated by way of example in the accompanying drawings in which:—

Fig. 1 shows in side elevation a machine provided with sub-soil shares.

Fig. 2 is a top plan view of Fig. 1.

Figs. 3 to 8 show forms of construction of devices provided with burrowing element for producing spaces or passages.

Figs. 3 to 5 show in side elevation, top plan view and end view respectively, a device with symmetrically arranged share-blades.

Figs. 6 and 7 are a top plan view and elevation respectively of a device with oblique share-blade.

Fig. 8 is a top plan view of a two-row burrowing element.

Figs. 9 to 18 show other forms of construction of the burrowing element.

Figs. 9 and 10 show in side elevation and end view respectively a burrowing element with a cavity in its upper side.

Figs. 11 and 12 are similar views of burrowing elements mounted on a share blade.

Fig. 13 is a side elevation of Figs. 14 and 15.

Fig. 14 is an end elevation of Fig. 13.

Fig. 15 is a top plan view of a modified form of construction of burrowing elements mounted on a share blade.

Figs. 16 and 17 show respectively in side elevation and top plan view a displacing element having its axis below the share blade plane.

Fig. 18 is a modified form of the construction shown in Fig. 16.

Fig. 19 is a front elevation of a sub-soil share such as is employed in the machine illustrated in Figs. 1 and 2.

In the examples illustrated in Figs. 1, 2 and 19 a row of sub-soil shares are fixed side by side adjustable in height on a frame 4 mounted on two stationary running wheels 1 and on a running wheel 3 steerable by a steering wheel 2. Each of these shares has a vertical wall 5 on the inclined under edge of which a trapezoid share blade 6 (Fig. 19) is fixed. The sub-soil shares are fixed on flat section irons 7, which are adjustable in height relative to the frame by means of screw bolts 8 and nuts 9. On a shaft 11 journalled in bearings 10 pressure rollers 12 are keyed. The bearings 10 can be adjusted in height relative to the frame 1 in a similar manner as the sub-soil shares. On the rear side of the frame a seat 13 is arranged for the attendant.

The machine is drawn by tractor or team in the direction indicated by the arrow. The distance between the rollers 12 and the sub-soil shares 5, 6 is equal to the spanning of the rows of plants. If the machine is moved forward, the walls 5 of the sub-soil shares cut open the earth, whereas the oblique blades 6 lift and loosen the earth in their entire width. The wheels 12 then roll over the earth thus loosened and press the rows of plants to the desired depth, whereas the soil between the rows of plants remains at the height to which it has been loosened. When the row of plants pressed down by the rollers has again righted itself and attained a certain height, the furrows formed are again filled with earth, for example, by transverse harrowing.

The running wheels 1, 3 may be so constructed that they also participate in the sinking of the rows of plants. They are then preferably shiftable on the shaft and made of a width suitable to suit the requirements. The rollers 12 and the sub-soil shares 5, 6 may also be adjustable individually on the frame.

The pressing down of the rows of plants, either with or without sub-soil loosening, may also be carried out during sowing in such a manner that the pressure rollers and, if necessary, also the sub-soil shares are arranged on the drilling machine.

Figs. 3 and 18 show different forms of construction of devices for producing hollow spaces or passages in the earth. They are conducted along under the plants in the earth, when it is desired to sink the plants. If they serve merely for improving fermentation in the ground, that is for working the soil independently of the plants, they are conducted under the surface of the soil at a greater or lesser depth and in any desired direction.

In the form of construction illustrated in Figs. 3 to 5 the burrowing element consists of a slender rod 15, the cross section of which gradually increases towards the rear, so that the rear portion is in the shape of a combined cone and cylinder 16. On the front end of the rod two rigidly united share blades 17 are fixed, the plane of which lies substantially horizontal but inclined slightly downwards relative to the axis of the burrowing element 15, 16, so that it slightly lifts the soil and allows it to fall behind the rear edge 18 during the movement of the device in the soil. The cutting edges 20 of the share blades 17 are inclined to the direction of movement of the device indicated by the arrow 19, so that adhering roots are deflected from the middle towards the sides without impairing the cutting effect of the blades by remaining roots hanging thereon. On each side of the rod 15 tines 21, 22 are fixed on the share blades 17 inclined at an angle to the rod 15 and not parallel to one another. In Fig. 3 the tine 22 is inclined at a sharper angle to the rod 15 than the tine 21. The share blades 17 rigidly connect the lower ends of a bow 23, by means of which the device is moved in the ground. The bow 23 is preferably of laterally projecting shape as illustrated in Fig. 3, as it has been found that a clogging of the earth in the bow is thus prevented. The vertical parts 24 of the bow may also be constructed as vertical coulters which cut through the ground and therefore assist the loosening effect of the share blades 17. The cutting edge of this coulter 24 is inclined to this direction of movement in a similar manner to the share blades 17.

In the form of construction illustrated in Figs. 6 and 7 a non-symmetrical substantially trapezoid share blade 17' is employed, instead of a symmetrical share blade. One lateral edge 25 of the trapezoid share blade 17' is bent at right angles and fixed by means of screws 26 on an upwardly projecting inclined arm 27. Oblique slots in the angle piece 25 and arm 27 serve for accommodating the screws 26, so that the angular position of the share blade 17' can be changed relative to the holding arm 27. The burrowing element 15, 16 and the tines 21, 22 are fixed to the share blade by a Cardan joint 28 in this form of construction.

In the form of construction shown in Fig. 8 two devices according to Figs. 6 to 7 are united to form an aggregate in that the angles 25 of two share blades 17' are connected the one with the other, and a common holding arm 27 is arranged at the point of junction. This arrangement presents the advantage over that shown in Figs. 6 and 7, that the arm 27 is relieved from one sided forces causing tortional stressing. The hinged connection between the blades 17' and the displacer element 15, 16 is in this case formed by chains 29, which, for the purpose of adapting the device to different drilling widths can be hooked into different holes 30 of the blades 17'.

When carrying out the process, several devices are preferably arranged side by side on the frame of a machine, which is moved over the field to be worked. As the forces necessary for moving the device in the ground are only slight, as experiments have shown, a great number of devices can be united on a single machine. If it is a question of carrying out the known lowering process, a light pressure roller is provided on the machine for each burrowing element on the rear side of the same, which rollers press downwards the strips of plants undermined by the cones 16. In this instance several burrowing elements and rollers are arranged side by side at a distance corresponding to the spacing of the rows of plants. The new device is mounted on the machine frame adjustable in height and preferably also in sideward direction and in the angular position. Several horizontal share blades and burrowing elements may also be arranged superposed on one vertical coulter.

The holder 27, carrying the burrowing element and the share blades, is set at an angle to the direction of movement of the device in a similar manner to the cutting edge of the share blades or coulters, so that any weeds or roots which it encounters slide upwardly without influencing the easy guiding of the device. The holder may be made of any desired shape, for example vertical in its upper portion above the surface of the ground.

In the form of construction illustrated in Figs. 9 and 10 the burrowing element 16 is of substantially the same shape as that shown in Figs. 3 to 8, but it has on its upper surface a depression 31 preferably extending towards the rear. Thus, the upper pressure surface is removed, and lifting and tearing asunder of the earth strip situated above the path is prevented.

In the form of construction shown in Figs. 11 and 12 a slot 32 extending from the top surface to the bottom surface is provided instead of a depression. Thus, a similar effect is attained to that of the first form of construction and moreover, a saving in weight is effected. Further, a burrowing element according to Figs. 11 and 12 cuts more easily into the soil, as the lower edges 39 of the remaining side faces easily cut into the soil. Such a burrowing element can be made projecting as desired, the remaining side faces 16, 16 may be at any desired distance apart without increase of weight.

Figs. 13 to 15 show burrowing elements 33 of inverted V-shaped cross-section enlarging in upward direction and in width towards their rear end and extending parallel to the direction of travel so that the forces exerted thereon by the soil have a vertical component and therefore keep the burrowing element in the ground. In Fig. 15 the burrowing elements 33 form solid bifurcations widening in upward direction and diverging towards their rear end forming a gap 32'. The burrowing element is arranged on a flat, generally horizontal share blade 34 and preferably forged in one piece with the share blade.

In the construction shown in Figs. 13 to 15 share blade 34 extends laterally from a coulter 36, at an angle thereto and is curved towards the rear at its lower end 35 so, that any roots or the like which it encounters slip off in downward direction providing they are not cut through. For example, the coulter 36 is made in the sickle-shape shown in Fig. 13. The coulter 36 is fixed by means of screws 37 on a holding element 38, which is mounted in suitable manner, for example adjustable, on the frame of the machine.

In the form of construction illustrated in Figs. 16 and 17 the burrowing element has two inclined side faces 40 converging to a point in the front. They are fixed on the underside of the share blade 34, which extends up to the rear edge 41. By this arrangement, similarly to the form of construction shown in Figs. 9 to 15, an upwardly acting pressing surface is entirely avoided, so that the burrowing element cannot carry out any raking up effect. According to the example illustrated in Fig. 18 the share blade 34 extends to the rear only slightly beyond the front edge of the plate 40, so that the slot between the plates 40 is open in upward direction. Thus, the pressure removing effect is assisted, as the slot acts accurately like the depression 31 shown in Figs. 9 and 10. In Figs. 13 to 15 and 16 to 18 one side face 33 or 40 of the burrowing element can be omitted, so that merely one inclined face remains, which produces the hollow space. The weight of the burrowing element is thus further reduced. The side faces 40, Figs. 16 to 18, may also be set at an incline like the faces 33 in Fig. 15, in order to impart a vertical component to the lateral force.

We claim:

1. A method for deeper setting of plants, especially cereals, consisting in loosening the soil directly under the plants without disturbing the same, in pressing down the loosened soil with the plants, in leaving the plants to recover and develop, and in subsequently smoothing the soil so as to partly cover the plants in the pressed down portions of the soil with the soil adjacent the pressed down portions.

2. An apparatus for the deeper setting of plants especially cereals, comprising in combination with the running wheels, a frame mounted on said running wheels, devices comprising subsoil shares mounted on said frame at a distance apart equal to the spacing of the rows of plants and adapted to loosen the soil under the roots of the plants, pressing devices carried by said frame one behind each of said subsoil shares adapted to press down the soil loosened by said shares and to deeper set the plants therein, and a shaft shiftably carrying said running wheels to allow them to participate in the deeper setting of the rows of plants.

3. A method for furthering the growth of plants, consisting in burrowing the soil below the surface of the ground leaving tubular passages parallel to the surface of the ground directly under the plants, and in cutting, tearing up and loosening the soil adjacent said tubular passages without disturbing the wall of said passages to increase the shaking and crumbling of the soil.

4. In an apparatus for loosening the soil under the plants preparatory to the deeper setting thereof the combination of a holding element, horizontal share blades mounted on the lower end of said holder, burrowing elements connected to the rear edge of said blades, and upwardly inclined tines fixed on the rear edge of said share blades adjacent said burrowing elements adapted to cut, tear up and loosen the soil adjacent tubular passages produced by said burrowing elements.

5. In an apparatus for loosening the soil under the plants preparatory to the deeper setting thereof the combination of a holding element, a vertical coulter curved towards the rear at its lower end and fixed on said holding element, a horizontal share blade extending laterally from said coulter at an angle thereto, and burrowing elements extending from the end of said share blade parallel to the width of said coulter, said burrowing elements being substantially of inverted V-shaped cross-section enlarging in upward direction and in width towards their rear end.

6. In an apparatus for loosening the soil under the plants preparatory to the deeper setting thereof the combination of a holding element, a vertical coulter curved towards the rear at its lower end and fixed on said holding element, a horizontal share blade extending laterally from said coulter at an angle thereto and bifurcated at its end, the bifurcations widening in upward direction towards their rear end.

FRIEDRICH SCHRÖDER-STRANZ.
HERMANN DENSTÄDT.
FRIEDRICH DENSTÄDT.